United States Patent
Seminel et al.

(10) Patent No.: US 11,401,030 B2
(45) Date of Patent: Aug. 2, 2022

(54) PROPELLER BLADE SPAR

(71) Applicant: Ratier-Figeac SAS, Figeac (FR)

(72) Inventors: Bruno Seminel, Figeac (FR); Stanislas Tutaj, Faycelles (FR)

(73) Assignee: RATIER-FIGEAC SAS, Figeac (FR)

( * ) Notice: Subject to any disclaimer, the term of this patent is extended or adjusted under 35 U.S.C. 154(b) by 0 days.

(21) Appl. No.: 16/384,079

(22) Filed: Apr. 15, 2019

(65) Prior Publication Data
US 2019/0315451 A1   Oct. 17, 2019

(30) Foreign Application Priority Data

Apr. 17, 2018 (EP) ..................... 18305470

(51) Int. Cl.
| | | |
|---|---|---|
| B64C 11/20 | (2006.01) | |
| B64C 3/18 | (2006.01) | |
| B29D 99/00 | (2010.01) | |
| F01D 5/14 | (2006.01) | |
| B29K 63/00 | (2006.01) | |
| B29K 105/08 | (2006.01) | |

(52) U.S. Cl.
CPC .......... *B64C 11/20* (2013.01); *B29D 99/0025* (2013.01); *B64C 3/185* (2013.01); *F01D 5/147* (2013.01); *B29K 2063/00* (2013.01); *B29K 2105/089* (2013.01); *F05D 2230/31* (2013.01)

(58) Field of Classification Search
CPC . B64C 3/185; B64C 3/18; B64C 11/20; F01D 5/147
See application file for complete search history.

(56) References Cited

U.S. PATENT DOCUMENTS

| | | | |
|---|---|---|---|
| 4,095,322 A | | 6/1978 | Scarpati et al. |
| 4,188,171 A | | 2/1980 | Baskin |
| 5,222,297 A | * | 6/1993 | Graff ....................... B64C 11/26 29/889.71 |
| 5,248,242 A | | 9/1993 | Lallo et al. |
| 5,462,408 A | | 10/1995 | Coffy |
| 5,755,558 A | * | 5/1998 | Reinfelder ............. B64C 27/473 416/230 |
| 6,666,651 B2 | | 12/2003 | Rust |
| 7,165,945 B2 | * | 1/2007 | Kovalsky ............... B29C 70/222 416/226 |

(Continued)

FOREIGN PATENT DOCUMENTS

| | | |
|---|---|---|
| DE | 2443726 A1 | 3/1976 |
| EP | 0610273 B1 | 8/1994 |

(Continued)

OTHER PUBLICATIONS

Extended European Search Report for International Application No. 18305470.9 dated Oct. 9, 2018, 8 pages.

(Continued)

*Primary Examiner* — Michael L Sehn
(74) *Attorney, Agent, or Firm* — Cantor Colburn LLP

(57) ABSTRACT

A method of manufacturing a spar for a propeller blade comprises forming a hollow inner core from a composite material, and then braiding carbon fibres around the inner core to form an outer spar structure. The hollow inner core may be formed using an inflatable bladder and a mould defining an outer shape of the spar. This construction avoids the need for a foam core to be provided within the spar.

16 Claims, 3 Drawing Sheets

(56) References Cited

U.S. PATENT DOCUMENTS

| | | | |
|---|---|---|---|
| 7,887,730 B2* | 2/2011 | Karem | F01D 5/147 |
| | | | 264/242 |
| 8,061,253 B2 | 11/2011 | Wybrow | |
| 8,591,197 B2 | 11/2013 | Metivier | |
| 9,168,998 B2 | 10/2015 | Moselage, III | |
| 9,366,155 B2* | 6/2016 | Tutaj | B64C 11/04 |
| 9,488,056 B2 | 11/2016 | Nagle et al. | |
| 9,505,491 B2 | 11/2016 | Byrnes et al. | |
| 9,604,417 B2 | 3/2017 | Modin | |
| 2003/0156944 A1 | 8/2003 | Rust | |
| 2011/0129348 A1 | 6/2011 | Parkin et al. | |
| 2011/0233837 A1 | 9/2011 | Schibsbye | |
| 2013/0343898 A1 | 12/2013 | Folsom et al. | |
| 2014/0133995 A1 | 5/2014 | Nagle et al. | |
| 2014/0271215 A1 | 9/2014 | Measom et al. | |
| 2016/0201478 A1 | 7/2016 | Kray et al. | |

FOREIGN PATENT DOCUMENTS

| | | | |
|---|---|---|---|
| EP | 2647568 A2 | 10/2013 | |
| EP | 3002111 A1 | 4/2016 | |
| WO | 2009032195 A1 | 3/2009 | |

OTHER PUBLICATIONS

CA Office Action for Application No. 3039181, dated Apr. 22, 2020, 5 pages.

* cited by examiner

PROPELLER BLADE SPAR

FOREIGN PRIORITY

This application claims priority to European Patent Application No. 18305470.9 filed Apr. 17, 2018, the entire contents of which is incorporated herein by reference.

TECHNICAL FIELD

The present disclosure relates to a method of manufacturing a spar for a propeller blade.

BACKGROUND

Modern propeller blades typically include a metal root which extends into a hub arm of a hub of a propeller system and which is secured to and rotatable relative to the hub arm via a retention assembly.

The blades are typically formed by mounting leading and trailing edge forms to a carbon-foam spar, which are then wrapped by a Kevlar® sock and sealed using resin transfer moulding. Such blades are light and effective for their intended purposes.

The carbon-foam spar is typically formed from carbon fibres braided around a polyurethane foam mandrel. To form the spar, a metallic blade root (sometimes referred to as a "tulip" in the industry) is connected to a polyurethane foam core, such that it fills a cavity of the blade root. Sometimes adhesive may also be provided between the polyurethane foam core and the blade root to ensure good adhesion.

Once connected to the blade root, the foam core may be used as a braiding mandrel. A structural layer is formed by braiding of carbon fibres over the foam core and the blade root, which ensures good attachment of the spar to the blade root. Exemplary techniques for manufacturing such spars are discussed in US 2014/133995 and U.S. Pat. No. 9,488,056.

Whilst polyurethane foams are cheap, their mechanical characteristics are poor. In particular, the injection process used for forming such foams is not consistently reproducible, which results in density and center-of-gravity variations. Furthermore, the thermal cycling that occurs during the blade manufacturing can stress or damage the spar due to differences in the coefficients of thermal expansion between the foam core and the carbon layer.

Foams with better characteristics do exist, but they are very expensive and introduce additional complexity to the manufacturing process. A need therefore exists for an improved technique for manufacturing such spars.

SUMMARY OF THE INVENTION

Viewed from a first aspect, the present disclosure provides a method of manufacturing a spar for an airfoil, comprising: forming an inner spar structure comprising a rigid body formed around at least one inflatable bladder or a removable core and mounted to an airfoil root, the rigid body being formed from a composite material; and forming an outer spar structure about the inner spar structure, the outer spar structure being formed from a composite material.

Forming the inner spar structure may comprise applying a plurality of fibres around the at least one inflatable bladder or the removable core. The fibres may comprise any fibre suitable for forming composite structures. The fibres may comprise one or more of glass fibres, carbon fibres and aramid (e.g. a para-aramid such as Kevlar®) fibres. The fibres may additionally or alternatively comprise vegetal-based fibers, such as one or more of linen fibres, hemp fibres and bamboo fibres. The fabric sheets may comprise prepreg composite fabric sheets or may be dry fabric sheets. The rigid body may be formed using a mould defining a shape of the spar. The prepreg composite sheet may be at least partially cured within the mould.

The rigid body may be only partially cured when forming the outer spar structure.

The composite material may comprise a fibre-reinforced polymer material. A matrix material of the composite material forming the rigid body may be a thermoset polymer or a thermoplastic polymer.

The inner spar may comprise an inner spar shell surrounding at least part of the airfoil root and at least part of the rigid core. The inner spar shell may be formed from a composite material. The composite material may comprise a fibre-reinforced polymer material. An adhesive may be applied between the inner spar shell and the airfoil root.

Forming the outer spar structure may comprise applying a plurality of fibres around the inner spar structure. The fibres may comprise any fibre suitable for forming composite structures. The fibres may comprise one or more of glass fibres, carbon fibres and aramid (e.g. para-aramid, such as Kevlar®) fibres. The fibres may additionally or alternatively comprise vegetal-based fibers, such as one or more of linen fibres, hemp fibres and bamboo fibres. The fibres may be applied by braiding the plurality of fibres around the inner spar structure. The fibres may be applied as one or more braided layers. The fibres may be braided around the rigid body and the airfoil root. A layer of adhesive may be applied over the inner spar structure before the braiding.

The fibres may be coated with a polymer matrix material, or forming the outer spar structure may comprise wetting the fibres with a polymer matrix material. The polymer matrix material may comprise epoxy resin.

The at least one inflatable bladder may be a removable core. The inflatable bladder may be formed from an elastomeric material. Forming the inner spar structure may comprise inflating the inflatable bladder, which may provide compaction and/or porosity draining. Forming the inner spar structure may comprise applying a vacuum to provide porosity draining.

The removable core may be formed from a chemically destructible material. The chemically destructible material may be destructible material by dissolving or by other chemical action. The chemically describable material may be destructible without causing structural damage to at least the inner spar structure.

The airfoil root may comprise a through-hole to permit removal of the removable core from the rigid body.

Forming the inner spar structure may comprise applying reinforcement to the rigid body.

The reinforcement may comprise local thickening of a region of the rigid body. The local thickening may comprise additional sheets of fibre material.

The reinforcement may comprise forming one or more reinforcement members internal to the rigid body.

The reinforcement members may comprise one or more elongate member. The elongate member may extend at least partially in an axial direction of the spar. The elongate member may have a C-shaped cross-section or an H-shaped cross-section. The reinforcement members may comprise one or more strut members extending at least partially in a chord-wise or thickness-wise direction.

The reinforcement members may be formed from the same composite material as the rigid body. The reinforcement members may be formed integrally with the rigid body.

The inner spar structure may comprise a sandwich construction. Forming the inner spar structure may comprise applying a first layer of fibres, applying a structural core outside of the first layer of fibres, and applying a second layer of fibres outside of the structural core. The structural core may comprise a honeycomb core. The structural core may comprise balsa wood or a foam material.

The removable core may be configured to permit removal of the removable core without damaging the support members. The at least one inflatable bladder or the removable core may comprise a first, axially-extending portion on a first side of at least one reinforcement member and a second axially-extending portion on a second side of at least one reinforcement member. The first and second portions of the at least one inflatable bladder or the removable core may be configured to engage with one another around the at least one reinforcement members. The first portion and the second portion of the at least one inflatable bladder or the removable core may be separate removable core portions. Each of the first portion and the second portion may be a separate bladder.

The method may comprise removing the at least one inflatable bladder or the removable core.

A method of manufacturing an airfoil may comprise: manufacturing a spar as described above; attaching one or more airfoil forms to the spar; and forming a airfoil surface from a composite material around the spar and the one or more airfoil forms.

The airfoil forms may define an outer surface shape of the airfoil. The airfoil forms may comprise one or both of a leading edge form and a trailing edge form. The airfoil forms may be formed from polymeric foam.

The composite material may comprise a fibre-reinforced polymer material. The fibres may comprise any fibre suitable for forming composite structures. The fibre may comprise one or more of glass fibres, carbon fibres and para-aramid (e.g. Kevlar®) fibres. The fibres may additionally or alternatively comprise vegetal-based fibers, such as one or more of linen fibres, hemp fibres and bamboo fibres. The polymer may comprise an epoxy resin. The composite material may be formed by resin transfer moulding.

Forming the airfoil surface may comprise curing the composite material of the airfoil surface. Forming the airfoil surface may comprise curing the composite material of one or both of the outer spar structure and the rigid body.

The airfoil may be a propeller blade.

Viewed from a second aspect, the present disclosure provides a spar for an airfoil, comprising: an inner spar structure having a rigid body mounted to a airfoil root, the rigid body being formed from a composite material, and the rigid body defining a hollow internal cavity or an internal cavity filled by at least one inflatable bladder or a removable core; and an outer spar structure formed about the inner spar structure, the outer spar structure being formed from a composite material.

The composite material of the rigid body may comprise a fibre-reinforced polymer material. The fibres may have been formed as fabric sheets. The fibres may comprise one or both of glass fibres and carbon fibres. The polymer material may comprise an epoxy resin.

The composite material of the outer spar structure may comprise fibre-reinforced polymer material. The fibres may have been applied by braiding a plurality of fibres around the inner spar structure. The fibres may comprise any fibre suitable for forming composite structures. The fibres may comprise one or more of glass fibres, carbon fibres and aramid (e.g. para-aramid, such as Kevlar®) fibres. The fibres may additionally or alternatively comprise vegetal-based fibers, such as one or more of linen fibres, hemp fibres, and bamboo fibres. The polymer matrix material may comprise epoxy resin.

The at least one inflatable bladder may be a removable core. The inflatable bladder may be formed from an elastomeric material.

The removable core may be formed from a chemically destructible material.

The blade root may comprise a through-hole to permit removal of the removable core from the cavity of the rigid body.

The inner spar structure may comprise one or more reinforcement members. The reinforcement members may be internal to the rigid body. The reinforcement members may be integral with the rigid body. The reinforcement members may be formed from the same composite material as the rigid body.

The inner spar structure may comprise a sandwich construction. The inner spar structure may comprise a first layer of fibre-reinforced polymer material, a structural core outside of the first layer, and applying a second layer of fibre-reinforced polymer material outside of the structural core. The structural core may comprise a honeycomb core.

The at least one inflatable bladder or the removable core may be removable without damaging the reinforcement members. The at least one inflatable bladder or the removable core may comprise a first, axially-extending portion on a first side of a reinforcement member and a second axially-extending portion on a second side of the reinforcement member. The first and second portions of the at least one inflatable bladder or the removable core may engage with one another around the reinforcement member.

An airfoil may comprise a spar as described above, wherein the rigid body comprises a hollow internal cavity; one or more airfoil forms mounted to the spar; and an airfoil surface formed from a composite material that surrounds the spar and the airfoil forms.

The airfoil forms may define an outer surface shape of the airfoil. The airfoil forms may comprise one or both of a leading edge form and a trailing edge form. The airfoil forms may be formed from polymeric foam.

The composite material may comprise a fibre-reinforced polymer material. The fibre may comprise Kevlar®. The polymer may comprise an epoxy resin. The composite material may be formed by resin transfer moulding.

The airfoil may be a propeller blade.

BRIEF DESCRIPTION OF THE DRAWINGS

Certain embodiments of the present disclosure will now be discussed in greater detail by way of example only and with reference to the following drawings, in which.

DETAILED DESCRIPTION

The following embodiment seeks to avoid the need for a foam core to be provided within a spar 10 used in a propeller blade 100, or similar airfoil. The spar 10 is instead constructed from a inner spar structure 20, for example formed from a moulded composite material, with an outer spar structure 30 formed around the inner spar structure 20. A method of manufacturing the spar 10 is set out below.

To avoid the use of a foam mandrel, an inner spar structure 20 may be constructed that may be sufficiently stiff to withstand the manufacturing loads of forming the spar 10 (for example, braiding pressure, resin transfer moulding injection pressure, etc.). The inner spar structure 20 may act as a core or mandrel for the construction of the outer spar structure 30. Whilst the inner spar structure 20 may provide some structural strength, the majority of the structural strength of the spar 10 will typically be provided by the outer spar structure 30.

Figure 1:
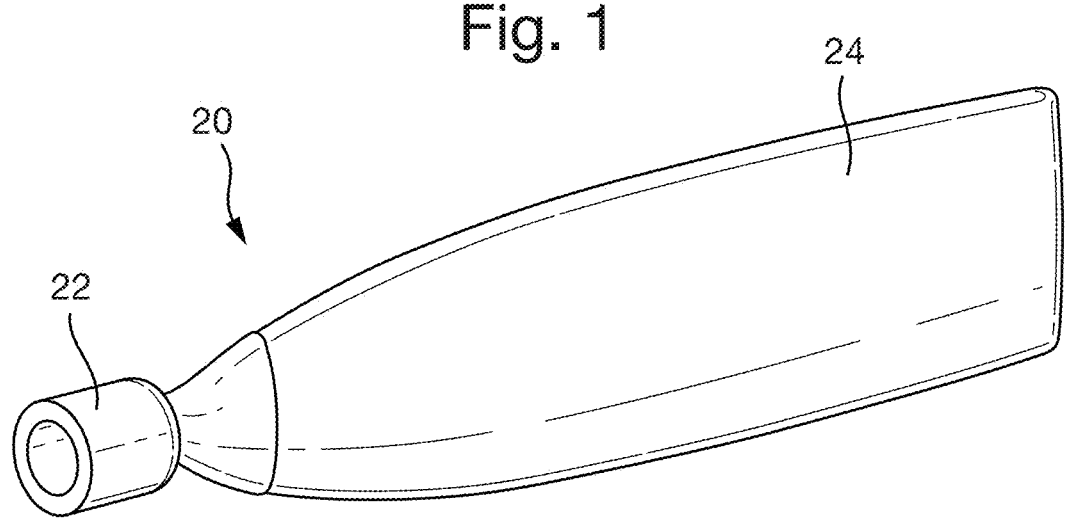
FIG. 1 shows an inner spar structure comprising a blade root and a hollow composite body.

The inner spar structure 20 is illustrated in FIG. 1. The inner spar structure 20 may comprise a blade root 22 and a spar core 24.

The blade root 22 may be of the type referred to as a "tulip" in the industry. For example, the blade root 22 may be shaped to be received by a propeller hub at one end and may comprise a cavity for receiving the spar core 24 at its other end. The cavity may be approximately cup-shaped.

Figure 2:
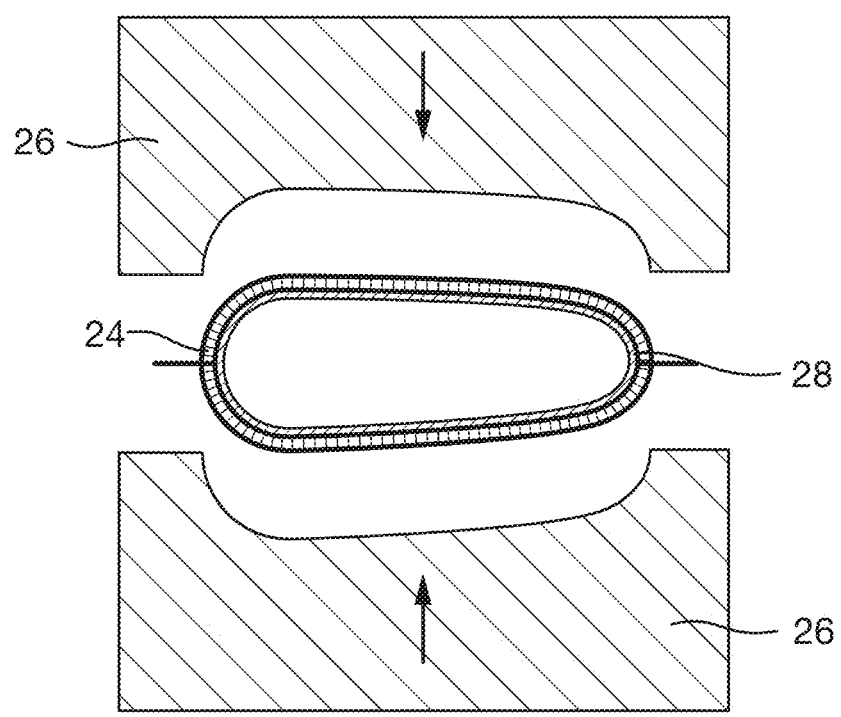
FIG. 2 is a cross-sectional view showing manufacture of the inner spar structure.

With reference to FIG. 2, the spar core 24 may be formed using a mould 26 to define a desired shape of the spar core 24. The shape of the spar core 24 may substantially define the shape of the spar 10. The spar core 24 may be formed in any suitable manner and may, for example, be formed from a composite material, such as a fibre-reinforced polymer material.

In one example, the spar core 24 may be formed by laying up of composite prepreg sheets in a mould 26 and inflating an inflatable bladder 28 within the mould 26 to form the prepreg sheets into the desired form. The spar core 24 may comprise a single layer of fabric sheets, or multiple layers of fabric sheets. By regulating the pressure within the inflatable bladder 28, compression may be applied to the prepreg sheets to conform them to the mould 26. Inflation of the bladder 28 may provide compaction and/or porosity draining. The inflation of the bladder 28 may be combined with suction applied around the mould 26 to assist the porosity draining.

In another example, dry fibre sheets may be laid up in the mould 26, in a similar manner to the prepreg sheets. The dry sheets may then be infiltrated with polymer matrix material, for example using a resin transfer moulding process. As with the prepreg sheets, an inflatable bladder 28 may be pressurised within the mould 26 to conform the fibre sheets to the shape of the mould 26. Again, inflation of the bladder 28 may provide compaction and/or porosity draining.

The reinforcement fibres of the prepreg sheets or fibre sheets may comprise carbon fibres, glass fibres or a mixture of glass and carbon fibres. It will be appreciated that other reinforcement fibres may be selected, as appropriate for the particular design conditions.

The polymer matrix material may comprise an epoxy resin. However, it will be appreciated that other polymeric materials may be selected, as appropriate for the particular design conditions. The polymer material may comprise a thermoset polymer or a thermoplastic polymer.

Whilst the bladder 28 is inflated, the polymer matrix material may be at least partially cured to form the spar core 24. In the case of a thermoset polymer, although the matrix material of the spar core 24 may be fully cured, it may be desirable not to fully cure the matrix material, e.g. such that the spar core 24 will cure fully when the final blade 100 is cured. This may enhance bonding between the spar core 24 and the outer spar structure 30.

The blade root 22 may be connected to the spar core 24 whilst the spar is being formed. Thus, as illustrated in FIG. 2, the blade root 22 may be at least partially received within the mould 26. For example, the cavity of the blade root 22 may be received within the mould 26 whilst the spar core 24 is being formed. Thus, inflation of the bladder 28 may compress the composite material of the spar core 24 against the blade root 22 such that a bond is formed, e.g. as the polymer matrix cures. Optionally, an adhesive may be applied to the interface between the blade root 22 and the spar core 24 to improve bonding.

In an alternative arrangement, the spar core 24 may be formed separately from the blade root 22 and may be bonded by adhesive or by any other suitable connection to form the inner spar structure 20.

As discussed above, an inflatable bladder 28 may be used during manufacture of the spar core 24. The bladder 28 may now be removed from the inner spar structure 20. The blade root 22 may comprise a through-hole 23 (see FIG. 5) to permit removal of the inflatable bladder 28. The through-hole 23 may extend in a generally axial direction.

Optionally, the bladder 28 may be retained within the inner spar structure 20 during manufacture of the outer spar core 30. The inflatable bladder 28 may be fully pressurised or may be partially pressurised, e.g. to a lower level than used during manufacture of the spar core 24. The bladder 28 may provide additional strength to the inner spar structure 20. This may be particularly advantageous where the polymer matrix material of the spar core 24 has only been partially cured.

The inner spar structure 20 may have a closed structure, except for the opening 23 in the blade root 22. Accordingly, it may be possible to pressurize the internal cavity of the inner spar structure 20 after removal of the bladder 28.

Pressurizing the internal cavity of the inner spar structure 20, either with or without the bladder 28, is most beneficial when using a resin transfer moulding (RTM) process, i.e. in order to balance the forces created by the RTM pressure. In some arrangements, the internal cavity could also be pressurized during a braiding process.

Whilst the spar core 24 may be formed as a simple casing, for example being substantially uniform in thickness, it may optionally include integral reinforcement. Reinforcement may be applied by forming a local over-thickness (spanwise or chordwise), for example by applying thicker fabric sheets or layering greater number of fabric sheets at desired locations.

Figure 3:
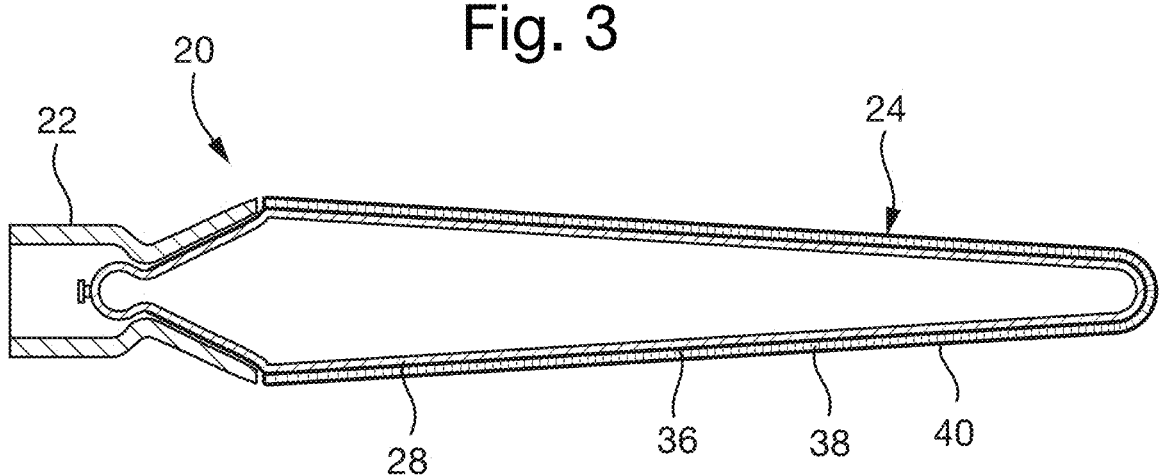
FIG. 3 is a cross-sectional view showing wall reinforcement of the inner spar structure.

FIG. 3 shows an example of an inner spar structure 20 having a reinforced wall 34.

The walls of the spar core 24 may comprise a sandwich structure. The sandwich structure may comprise an inner layer 36, a structural core 38, and an outer layer 40. The inner layer 36 and/or the outer layer 40 may comprise layers of reinforcement fibres, which may be pre-impregnated with a matrix material. The structural core 38 may comprise one or more of a honeycomb material, a foam material, and balsa wood.

The sandwich structure may assist in resisting the various stresses arising during blade manufacturing, such as internal pressure, flexural stresses, compression, and pressure during RTM processes.

The inner layer and/or the outer layer may bond the sandwich structure to the blade root. For example, the outer layer of the sandwich structure may cover at least part of an outer surface of the blade root 22, and/or the inner layer may cover at least part of an inner surface of the blade root 22.

The sandwich structure, e.g. particularly the inner and outer layers, may be cured in a single cure cycle. The outer layer 40 of the sandwich structure may be an outermost layer of the inner spar structure 20.

The structural core 38 may reduce the need for high internal pressurisation of the inner spar structure 20. The inner layer 36 and/or the outer layer 40 may comprise pre-impregnated, out-of-autoclave (OOA) fibres. Curing of the sandwich structure may comprise applying a peripheral vacuum around the root 22 and the outboard structure, and applying a very low pressure (e.g. less than 0.5 bar) to the bladder 28 to compact the sandwich structure and to eliminate porosities. It may be possible, with an appropriate design, to keep the interior hollow until the final manufacturing step (e.g. an RTM process).

Figure 4:
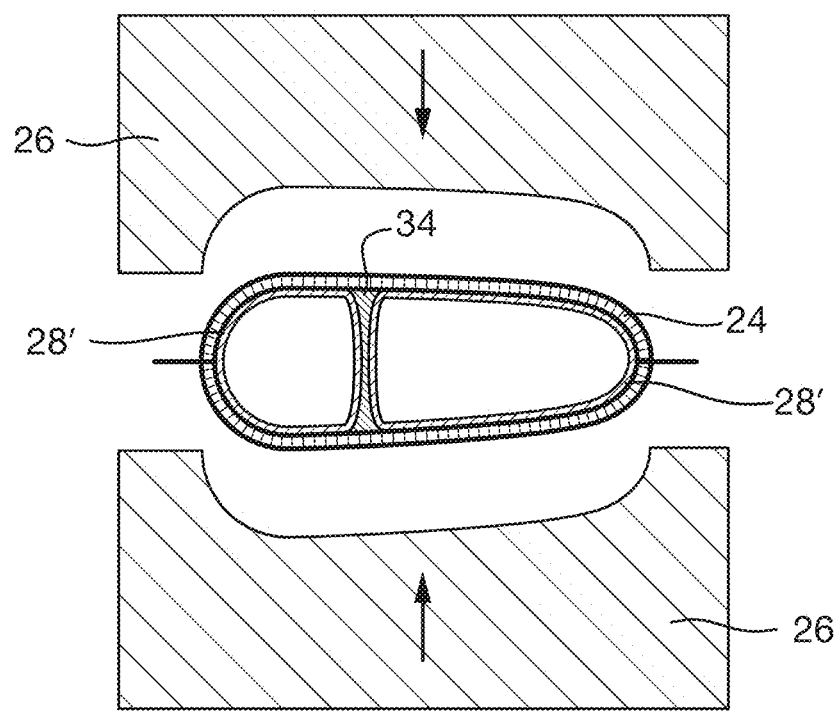
FIG. 4 is a cross-sectional view showing internal reinforcement of the inner spar structure.

The spar core 24 may additionally or alternatively comprise internal reinforcement 34 (see FIG. 4). The internal reinforcement 34 may reinforce against compressive loading. For example, the internal reinforcement 24 may extend from a first internal face of the spar core 24 to a second internal face of the spar core 24. The internal reinforcement 34 may be formed integrally with the spar core 24. The internal reinforcement 34 may be formed from a fibre-reinforced polymer material, and may be formed from the same material as the spar core 24.

The internal reinforcement 34 may comprise one or more reinforcement members. Each reinforcement member may, for example, comprise an elongate member extending approximately axially along the spar. The elongate member may have a C-shaped cross-section, an H-shaped cross-section, or any other shaped cross-section suitable for providing reinforcement. The internal reinforcement may alternatively or additional comprise a plurality of strut-like reinforcement members extending generally in a chordwise or thicknesswise direction.

With reference to FIG. 4, a specially formed bladder 28' may be used to form the internal reinforcement member 34. For example, the bladder 28' may comprise two or more lobes, which may divide the cavity within the spar core 24 into two or more volumes. The lobes may permit the bladder 28' to be removed without damaging the reinforcement members. For example, the reinforcement member(s) 34 may be laid up between the lobes of the bladder 28'. Alternatively, two or more separate bladders 28' may be used, which may divide the cavity within the spar core 24 into two or more separate volumes.

Figure 5:
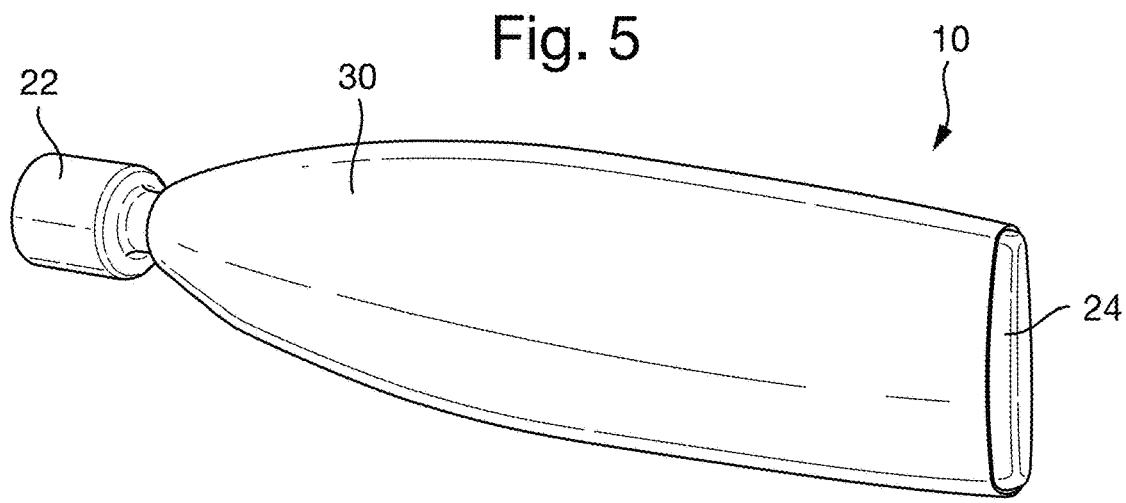
FIG. 5 shows an outer spar structure formed around the inner spar structure.
Figure 6:
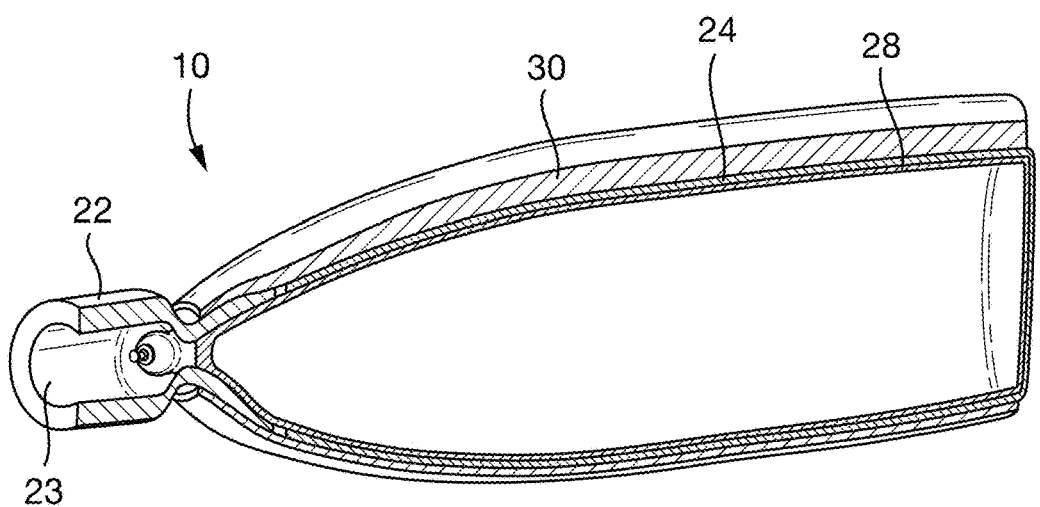
FIG. 6 is a cut-away view showing the layered construction of the spar structure.

After manufacture of the inner spar structure 24, the outer spar structure 30 may be formed. The outer spar structure is illustrated in FIGS. 5 and 6.

The outer spar structure 30 may be formed of a composite material. The composite material may comprise a fibre-reinforced polymer material, i.e. comprising a polymer matrix material reinforced with a plurality of reinforcement fibres. The outer spar structure 30 may surround the inner spar structure 20, and may extend over both the blade root 22 and the spar core 24, so as to ensure a firm connection to the blade root 22. The outer spar structure 30 may be formed by one or a plurality of layers that may be separately braided onto the inner spar structure 20. For example, a braiding machine can be used to wrap reinforcement fibres around the inner spar structure 20 from the one end thereof to the other in the span-wise direction. Upon reaching the end of the spar 10, the braiding can then be repeated again in the same manner.

It will be appreciated that the outer spar structure 30 may be formed by braiding of dry fibres, which are then subsequently infiltrated with a polymer matrix material. In alternative arrangements, the outer spar structure 30 may be formed by braiding resin-coated fibres or thermoplastic (TP) co-melted fibres. Furthermore, other manufacturing techniques, such as RTM, may be used as appropriate.

The outer spar structure 30 may not be cured immediately after manufacture. Instead, the braided fibres may be left "dry" as the rest of the blade 100 is formed. The reinforcement fibres of the outer spar structure 30 may be impregnated at the same time as the final blade 100. For example, the blade 100 may be impregnated by RTM, which may also impregnate the fibres of the outer spar structure 30. This arrangement may ensure good bonding of the components within the blade 100.

As shown in FIG. 6, the inflatable bladder 28 may be retained within the spar 10 as the blade 100 is formed, or may be removed at this stage.

Figure 7:
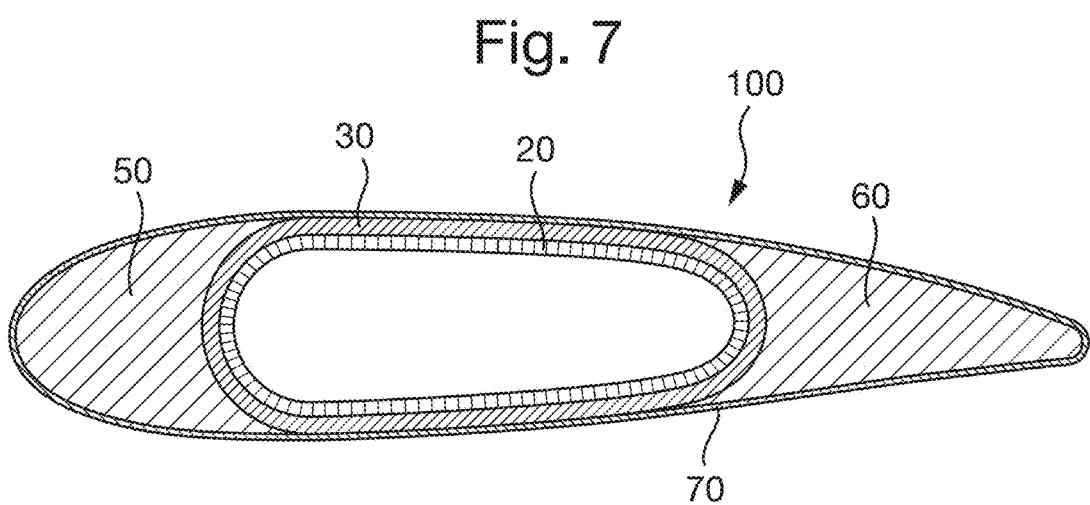
FIG. 7 is a cross-section through a blade comprising leading and trailing edge forms mounted to the spar structure.

After forming the spar 10, the blade 100 is then formed. As shown in FIG. 7, a leading edge form 50 and a trailing edge form 60 are attached to the spar 10. The leading and trailing edge forms 50, 60 may be formed from a polymeric foam, such as polyurethane foam. The leading edge form 50 and the trailing edge form 60 may, respectively, define the leading edge and the trailing edge of the blade. Optionally an adhesive may be provided to bond the leading edge form 50 and/or the trailing edge form 60 to the spar 10.

The blade surface 70 may be formed of a composite material, such as a fibre-reinforced polymer. The blade surface may surround the spar 10, the leading edge form 50 and the trailing edge form 60.

The blade surface 70 may be formed by applying dry reinforcement fibres. The blade surface 70 may be formed by one or a plurality of layers that may be separately braided. The blade surface 70 may define the desired, outer shape for the blade 100. The fibres may be formed from an aramid material, such as Kevlar®, or other suitable material.

After applying the dry reinforcement fibres, the blade 100 may be formed by RTM. The RTM process may simultaneously impregnate the fibres of the blade surface 70 and the fibres of the outer spar structure 30. During resin injection, for example during the RTM process, the cavity within the inner spar structure 20 may be pressurized to balance a resin injection pressure.

Finally, blade 100 is cured, which may (fully) cure the composite materials forming the blade surface 70 and/or the outer spar structure 30 and/or inner spar structure 20, if they were not (fully) cured during their manufacture. If the inflatable bladder 28 has not yet been removed, then it may be removed at this stage, as it should not remain in the final blade 100.

Whilst the above embodiments relate to the manufacture of a spar 10 for a blade 100 using an inflatable bladder 28, it will be appreciated that other techniques are possible to form the spar core 24 without the need for a foam core to remain within the blade 100. For example, the inflatable bladder 28 may be replaced by any other removable forming tool, such as a mechanically destructible forming tool or chemically destructible forming tool. As used herein, the term "removable forming tool" is intended to refer to a forming tool that may be removed from within the inner spar structure 20 after manufacture and without causing structural damage to the spar 10.

Whilst the above embodiments relate to the manufacture of a blade 100 where the inflatable bladder is removed, in some embodiment the inflatable bladder 100 could be left intact within the spar 10 of the blade 100.

The invention claimed is:

1. A method of manufacturing a spar for an airfoil, comprising:
    forming an inner spar structure comprising a rigid body formed around at least one inflatable bladder or a removable core and mounted to an airfoil root, the rigid body being formed from a first composite material; and
    forming an outer spar structure about the inner spar structure, the outer spar structure being formed from a second composite material;
    wherein the first composite material of the rigid body has been at least partially cured before forming the outer spar structure.

2. The method according to claim 1, wherein forming the inner spar structure comprises applying a plurality of fibres around the at least one inflatable bladder or the removable core, wherein the fibres are applied as fabric sheets.

3. The method according to claim 1, wherein forming the inner spar structure comprises applying a first layer of fibres, applying a structural core outside of the first layer of fibres, and applying a second layer of fibres outside of the structural core, such that a wall of the inner spar structure has a sandwich construction.

4. The method according to claim 1, wherein the rigid body is formed around the at least one inflatable bladder.

5. The method according to claim 1, wherein the rigid body is formed around the removable core, which is formed from a chemically destructible material.

6. The method according to claim 5, wherein the airfoil root comprises a through-hole to permit removal of the removable core from the rigid body.

7. The method according to claim 1, wherein forming the inner spar structure comprises forming one or more reinforcement members internal to the rigid body, wherein the reinforcement members are formed from the same composite material as the rigid body and are formed integrally with the rigid body.

8. The method according to claim 7, wherein the at least one inflatable bladder or the removable core comprises a first, axially-extending portion on a first side of at least one of the reinforcement members and a second axially-extending portion on a second side of the at least one of the reinforcement members, the first and second portions being configured to engage with one another around at least one of the reinforcement members.

9. A method of manufacturing an airfoil comprising:
    manufacturing a spar according to the method of claim 1;
    attaching one or more airfoil forms to the spar; and
    forming an airfoil surface from a composite material around the spar and the one or more airfoil forms.

10. A method of manufacturing a spar for an airfoil, comprising:
    forming an inner spar structure comprising a rigid body formed around at least one inflatable bladder or a removable core and mounted to an airfoil root, the rigid body being formed from a first composite material, wherein the rigid body is formed using a mould defining a shape of the inner spar structure; and
    forming an outer spar structure about the inner spar structure, the outer spar structure being formed from a second composite material, wherein forming the outer spar structure comprises braiding a plurality of fibres around the inner spar structure;
    wherein the first composite material of the rigid body has been at least partially cured before forming the outer spar structure.

11. The method according to claim 10, wherein forming the inner spar structure comprises applying a plurality of fibres around the at least one inflatable bladder or the removable core, wherein the fibres are applied as fabric sheets.

12. The method according to claim 10, wherein forming the inner spar structure comprises applying a first layer of fibres, applying a structural core outside of the first layer of fibres, and applying a second layer of fibres outside of the structural core, such that a wall of the inner spar structure has a sandwich construction.

13. The method according to claim 10, wherein the airfoil root comprises a through-hole to permit removal of the removable core from the rigid body.

14. The method according to claim 10, wherein forming the inner spar structure comprises forming one or more reinforcement members internal to the rigid body, wherein the reinforcement members are formed from the same composite material as the rigid body and are formed integrally with the rigid body.

15. The method according to claim 14, wherein the at least one inflatable bladder or the removable core comprises a first, axially-extending portion on a first side of at least one of the reinforcement members and a second axially-extending portion on a second side of the at least one of the reinforcement members, the first and second portions being configured to engage with one another around at least one of the reinforcement members.

16. A method of manufacturing an airfoil comprising:
    manufacturing a spar according to the method of claim 10;
    attaching one or more airfoil forms to the spar; and
    forming an airfoil surface from a composite material around the spar and the one or more airfoil forms.

* * * * *